United States Patent [19]
Boylan et al.

[11] Patent Number: 5,920,475
[45] Date of Patent: Jul. 6, 1999

[54] CIRCUIT AND METHOD FOR CONTROLLING A SYNCHRONOUS RECTIFIER CONVERTER

[75] Inventors: Jeffrey L. Boylan, Dallas; Allen Frank Rozman, Richardson, both of Tex.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/696,674

[22] Filed: Aug. 14, 1996

Related U.S. Application Data

[63] Continuation-in-part of application No. 08/434,712, May 4, 1995.

[51] Int. Cl.$^6$ .......................... H02M 5/42; H02M 7/217; H02H 7/125; G05F 1/10
[52] U.S. Cl. .............................. 363/127; 363/89; 363/53; 323/239
[58] Field of Search ................................ 363/127, 89, 20, 363/21, 53, 71, 65, 97, 81, 84; 323/239

[56] References Cited

U.S. PATENT DOCUMENTS

| | | | |
|---|---|---|---|
| 4,371,919 | 2/1983 | Andrews et al. | 363/65 |
| 4,716,514 | 12/1987 | Patel | 363/127 |
| 4,870,555 | 9/1989 | White | 363/21 |
| 5,036,452 | 7/1991 | Loftus | 307/82 |
| 5,128,603 | 7/1992 | Wolfel | 323/282 |
| 5,274,543 | 12/1993 | Loftus, Jr. | 363/127 |
| 5,303,138 | 4/1994 | Rozman | 361/89 |
| 5,457,624 | 10/1995 | Hastings | 363/21 |
| 5,636,116 | 6/1997 | Milavec et al. | 363/89 |

OTHER PUBLICATIONS

Article entitled "A High–Efficiency 30–W Board Mounted Power Supply Module" by Naoki Murakami, Junichi Asoh, Kazuhiko Sakakibara and Toshiaka Yachi; Intelec; Nov. 1991.

Article entitled "Practical Application of Mosfet Synchronous Rectifiers" by James Blanc of Siliconix Incorporated; Nov. 1991.

Article entitled "A Compact, Highly Efficient 50–W On–board Power Supply Module for Telecommunications Systems" by Nobuhiko Yamashita, Naoki Murakami and Toshiaka Yachi; 1995.

Article entitled "A Highly Efficient, Low–profile 300–W Power Pack for Telecommunications Systems" by N. Murakami, I. Yumotok T. Yachi and K. Maki; 1994.

Publication entitled "The RM Series of DC–DC Converters, Up To 90% Efficient @ 5V/100W" by Lambda Electronics Inc.

(List continued on next page.)

*Primary Examiner*—Peter S. Wong
*Assistant Examiner*—Bao Q. Vu

[57] ABSTRACT

For use in a power system having a power train, a rectifier having an input and an output and a method of controlling the rectifier. The rectifier comprises: (1) switching circuitry coupled between the input and the output, the switching circuitry adapted to operate in selected one of (a) a bidirectional mode of operation and (b) an unidirectional mode of operation to rectify substantially alternating current at the input to produce substantially direct current at the output; and (2) control circuitry coupled to a control input of the switching circuitry, the control circuitry capable of sensing a characteristic of the power system and transitioning the switching circuitry between the bidirectional mode and the unidirectional mode as a function of the characteristic thereby to prevent substantial reverse power flow through the rectifier.

54 Claims, 8 Drawing Sheets

OTHER PUBLICATIONS

Article entitled "High Efficiency, Synchronous, Step–down (Buck) Controllers" from Unitrode Integrated Circuits.

Publication entitled "EL7558 Programmable CPU Power Supply Unit" from Elantec; March 13, 1996.

Publication entitled "High Efficiency Synchronous Step–Down Switching Regulators" by Linear Technology; 1994.

Publication entitled "Designing a High Efficiency DC–DC Converter with the EL7560" by Elantec.

Publication entitled "High Efficiency Synchronous, Step Down Controller" of Unitrode Integrated Circuits; 1995.

Publication entitled "A Simple and Efficient Synchronous Rectifier for Forward DC–DC Converters" by N. Murakami, H. Namiki, K. Sakakibara and T. Yachi; Interdisciplinary Research Laboratories; Nippon Telegraph and Telephone Corporation; 1993.

Publication entitled: "A Mosfet Resonant Synchronous Rectifier for High–Frequency DC/DC Converters" by Wojciech A. Tabisz, Fred C. Lee and Dan Y. Chen; Virginia Power Electronics Center; Thr Bradley Department of Electrical Engineering; Virginia Polytechnic Institute and State University; 1990.

Publication entitled "Improving Power Supply Efficiency with Mosfet Synchronous Rectifiers" by Richard S. Kagan, Bell Telephone Laboratories, Inc. and Min–hwa Chi; Chen-ming Hu of University of California; 1982.

Publication entitled Mosfets Move In On Low Voltage Rectification (TA84–2); 1984.

“ ”

CIRCUIT AND METHOD FOR CONTROLLING A SYNCHRONOUS RECTIFIER CONVERTER

CROSS-REFERENCE TO RELATED APPLICATIONS

This application is a continuation-in-part of U.S. patent application Ser. No. 08/434,712, entitled "Circuit and Method for Controlling a Synchronous Rectifier Converter," to Rozman, filed on May 4, 1995. The above-listed application is commonly assigned with the present invention and is incorporated herein by reference as if reproduced herein in its entirety.

TECHNICAL FIELD OF THE INVENTION

The present invention is directed, in general, to power systems and, more particularly, to a control circuit for operating a power rectifier in both a bidirectional and unidirectional mode of operation as a function of a characteristic of the power system.

BACKGROUND OF THE INVENTION

Increased power density is a continuing goal of modern power supply design. High power density is particularly crucial in applications wherein the allocated space for the power supply relative to the power output is restricted. In addition to being highly compact, the power supply must also be efficient to limit heat-creating power dissipation. Illustrative applications for a high density power supply include an off-line power supply used to power a laptop computer or a power supply module for a telecommunication system employing an Integrated Services Digital Network ("ISDN").

Bridge-type converters are particularly suitable for such applications, since they may be designed to operate resonantly. Resonance is an operational mode that permits both high power density and efficiency. One example of a bridge-type converter is a half-bridge converter as disclosed in U.S. Pat. No. 5,274,543 to Loftus, issued on Dec. 28, 1993, entitled "Zero-Voltage Switching Power Converter with Lossless Synchronous Rectifier Gate Drive" and incorporated herein by reference. Loftus' converter operates as a forward converter and includes a bridge circuit comprising two power switching transistors to drive a primary transformer.

Loftus discloses a drive arrangement and operative scheme for driving the power transistors, thereby limiting the dissipation losses within the power switching transistors. The drive circuitry drives the power switching transistors with unequal duty cycles having a conducting duration such that the sum of the conduction intervals substantially equals the combined switching period of the power transistors. The conducting intervals are separated by very short dead time intervals controlled by the differing turn-on and turn-off times of the power switching transistor. The short interval between alternate conductions of the power switching transistors is sufficient in duration to allow zero voltage turn-on of the power switching transistors but short enough in duration to minimize power loss and conducted noise.

Another area of concern in a power supply is an additional loss of efficiency realized through the power dissipated in the rectifier circuit of the converter. While a Schottky diode rectifier is approximately 80% efficient, a metal oxide semiconductor field effect transistor ("MOSFET") synchronous rectifier is nearly 90% efficient.

While synchronous rectification is a relatively old concept, it has failed to gain widespread acceptance because of the unavailability of cost-effective, low $R_{DS(on)}$ rectifier devices (those having a small static drain-source resistance while forward-biased). Prior practical implementations have required designers to couple many higher $R_{DS(on)}$ devices in parallel to arrive at a suitably low overall $R_{DS(on)}$. Recent advances in high cell density MOSFET technology, however, have made available MOSFET devices with very low (<10 milliohms) $R_{DS(on)}$ in cost-effective, commercial packages. As a result, synchronous rectification has recently regained widespread interest; companies are beginning to introduce power converters using synchronous rectification into the marketplace.

The normal operating mode for converters operating with forced load-sharing is for each converter to provide an equal portion of the total load current. A control terminal of the converters are coupled together in a star connection, thereby providing the necessary feedback to equalize the load currents actively.

However, it is well known in the industry that synchronous rectifier circuits are capable of processing power bidirectionally, both from the input to the output, and from the output back to the input (of course, provided a voltage or current source externally drives the output). Bidirectional current flow can provide some significant advantages, perhaps the most common of which is elimination of the so-called critical current phenomenon found in buck-derived converters. The bidirectional current flow characteristic allows inductor current in the synchronous rectifier circuit to flow continuously, thereby avoiding a sluggish reaction to a load or transient on the output of the converter circuit.

However, for converters connected in parallel with forced load-sharing, this bi-directional power flow characteristic can result in an undesirable (and possibly damaging) operating mode wherein one converter drives the output of another. With one or more converters operating in this reverse power processing mode, the overall power system can be circulating large amounts of current while actually delivering very little current to the load. This results in high power dissipation during lighter load conditions. Also, the system transient response could be detrimentally affected as the converters transition from the reverse power processing mode to a forward power processing mode.

Parallel (forced load-sharing) circuitry in each converter, responsible for driving the rectifier devices, may not be able to prevent this mode of operation, as the parallel circuit is specifically designed to be effective over a limited range. See U.S. Pat. No. 5,036,452 to Loftus, issued on Jul. 30, 1991, entitled "Current Sharing Control with Limited Output Voltage Range for Paralleled Power Converters," and incorporated herein by reference, for a discussion of load sharing between power circuits connected in parallel to a common load. Therefore, it is beneficial to provide a circuit that prevents reverse power flow in converters configured for parallel operation.

The aforementioned predicament of reverse power flow in converters for parallel operation is the subject of two articles. These articles introduce a circuit wherein the synchronous rectifier control voltage is modified to prevent reverse power flow. The circuits are generally designed either to prevent reverse power flow at converter start-up or to address "hot plug-in" problems encountered when substituting individual converters in a functioning power system.

In the first article, "A Highly Efficient, Low-Profile 300-W Power Pack for Telecommunications Systems,"

APEC 1994 Proceeding, pp. 786–792, by N. Murakami, I. Yumoto, T. Yachi and K. Maki, a resonant reset forward converter with a novel synchronous rectifier drive circuit is disclosed. The circuit comprises a pair of switches to disable the gate drive of one synchronous field effect transistor ("FET") based on switch current. Another synchronous FET uses an output inductor to generate the drive voltage, and can be configured off when the inductor current goes discontinuous. The idea is to detect when the converter goes into discontinuous conduction mode, and to use this information to disable the synchronous rectifiers, thus preventing a catastrophic failure. The described circuit, which is designed for parallel operation, uses droop regulation to achieve load sharing, rather than active load sharing using a parallel pin connection. The circuit, thus, turns one of the FETs off based on switch current, and the other FET off based on a discontinuous current condition.

While the Murakami et al. circuit attempts to solve the proposed problem it is limited for the following reasons. First, the circuit as described is only compatible with a self-synchronized drive scheme. Moreover, the circuit as described apparently only has a problem when a converter falls below critical inductor current. Both the transformer secondary voltage and the inductor voltage can collapse to zero during discontinuous conduction mode. The output voltage supplied by the paralleled modules could then energize the gates of the synchronous FETs, thus turning them on at the wrong time. Stated another way, the resonant reset topology forces a finite dead time in the gate drive of one synchronous FET, allowing the critical current point to occur. Finally, the circuit as described is limited to a passive droop sharing method, and does not accomplish active load sharing with a feedback sensing current circuit.

In a second reference by N. Murakami, N. Yamashita and T. Yachi, entitled "A Compact, Highly Efficient 50-W On-board Power Supply Module for Telecommunications Systems," APEC 1995 Proceeding, pp. 297–302, a resonant reset forward converter with a novel synchronous rectifier drive circuit is introduced very similar to the circuit described above. The circuit comprises a pair of self synchronized FETs with a control switch in series with each gate. These switches are described as necessary to prevent reverse power flow when connected in parallel with other converters. This circuit suffers from the very same limitations inherent in the circuit described above. Again, the circuits by Murakami et al. prevent reverse power flow by turning the rectifying FET off when the voltage across the output inductor falls to zero (a condition which occurs during discontinuous inductor current mode). This prevents the bus voltage from activating the rectifying FET when the inductor voltage falls to zero. The circuits as described, however, still operate as synchronous rectifiers at all times.

Accordingly, what is needed in the art is a control circuit for operating a power rectifier, the control circuit capable of sensing conditions under which reverse power flow may occur in the rectifier and taking steps to prevent the reverse power flow.

SUMMARY OF THE INVENTION

U.S. patent application Ser. No. 08/434,712 is directed toward a control circuit for operating a power rectifier in both a bidirectional and unidirectional mode of operation as a function of an output level of the rectifier. The control circuitry is capable of sensing an output level of the rectifier and transitioning switching circuitry between the bidirectional mode and the unidirectional mode as a function of the output current level to prevent substantial reverse power flow through the rectifier.

Thus, U.S. patent application Ser. No. 08/434,712 introduces a bi-modal converter having both a bidirectional and unidirectional mode of operation. The output level of the converter may be determined by measuring voltage, current, power or another suitable characteristic. The rectifier is particularly useful in power systems having a plurality of rectifiers operating in parallel to prevent one rectifier from driving the other.

To compliment U.S. patent application Ser. No. 08/434,712, the present invention provides a control circuit for operating a power rectifier in both a bidirectional and unidirectional mode of operation, but as a function of a characteristic of the power system employing the rectifier as opposed to an output level of the rectifier.

More specifically, the present invention provides, for use in a power system having a power train, a rectifier having an input and an output and a method of controlling the rectifier. The rectifier includes: (1) switching circuitry coupled between the input and the output, the switching circuitry adapted to operate in selected one of (a) a bidirectional mode of operation and (b) an unidirectional mode of operation to rectify substantially alternating current at the input to produce substantially direct current at the output; and (2) control circuitry coupled to a control input of the switching circuitry, the control circuitry capable of sensing a characteristic of the power system and transitioning the switching circuitry between the bidirectional mode and the unidirectional mode as a function of the characteristic thereby to prevent substantial reverse power flow through the rectifier.

The present invention, therefore, also introduces a bi-modal converter having two modes of operation. In the bidirectional mode, the switching circuitry switches to rectify the substantially alternating current, perhaps in resonance to realize the efficiencies of a resonant converter. Bidirectional current flow is possible in this mode of operation. In the unidirectional mode, the switching circuitry acts as a diode rectifier, allowing only unidirectional current and thereby preventing reverse power flow. The control circuitry switches between the bidirectional and unidirectional modes of operation as a function of characteristics of the power system employing the rectifier. The characteristics include, without limitation, a signal indicative of an output level of the rectifier, an intermediate control signal of the power system, an error signal of the power system, a duty ratio of a switch associated with the power train of the power system and a period of time associated with an operation of the power system. The rectifier is particularly useful in power systems having a plurality of rectifiers operating in parallel to prevent one rectifier from driving the other.

In an alternative embodiment of the present invention, the switching circuitry comprises MOSFET switches. Alternatively, other switches having a low $R_{DS(on)}$ are suitable for use with the present invention. Moreover, one skilled in the pertinent art should understand that any switching device (e.g., GaAsFET) is well within the broad scope of the present invention.

In an alternative embodiment of the present invention, the switching circuitry comprises a plurality of switches, the control circuitry capable of transitioning the switching circuitry between the bidirectional mode and the unidirectional mode by disabling all of the plurality of switches. In the present embodiment, the rectifier transitions to the unidirectional mode of operation by disabling all of the plurality of switches associated with the switching circuitry. However, analogous to the rectifier disclosed in U.S. patent application Ser. No. 08/343,712, one skilled in the pertinent art should understand that the rectifier also transitions to the unidirectional mode of operation by disabling at least one of the plurality of switches associated with the switching circuitry.

In an alternative embodiment of the present invention, the rectifier is coupled in parallel with a second rectifier, the control circuitry substantially preventing the second rectifier from causing the substantial reverse power flow. Thus, the present invention is operable in a power system comprising multiple rectifiers.

In an alternative embodiment of the present invention, the switching circuitry comprises discrete diodes to allow the switching circuitry to operate in the unidirectional mode. The diodes conduct electricity when the control circuitry deactivates the switches. As an alternative to discrete diodes, the present invention may employ body diodes integral with MOSFET switches.

In an alternative embodiment of the present invention, the rectifier further comprises a self-synchronized drive circuit adapted to provide a drive signal to the switching circuitry for varying a duty cycle of the switching circuitry as a function of the characteristic of the power system (closed loop). Alternatively, the rectifier may be controlled without regard to actual characteristic of the power system (open loop).

In an alternative embodiment of the present invention, an active load-sharing circuit is coupled to the rectifier and a second rectifier to effect load sharing therebetween. In a related, but alternative embodiment, the control circuitry is enabled only when the rectifier is coupled in parallel with the second rectifier.

In an alternative embodiment of the present invention, the control circuit transitions the switching circuitry from the bidirectional mode to the unidirectional mode when the characteristic of the power system drops below a predetermined threshold level. For instance, the control circuitry transitions the switching circuitry between the bidirectional mode and the unidirectional mode when a signal indicative of an output current of the rectifier is between about 5% and about 10% of a full rated output current level. Those skilled in the pertinent art should recognize, however, that other levels or ranges are well within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

DETAILED DESCRIPTION

Figure 1:
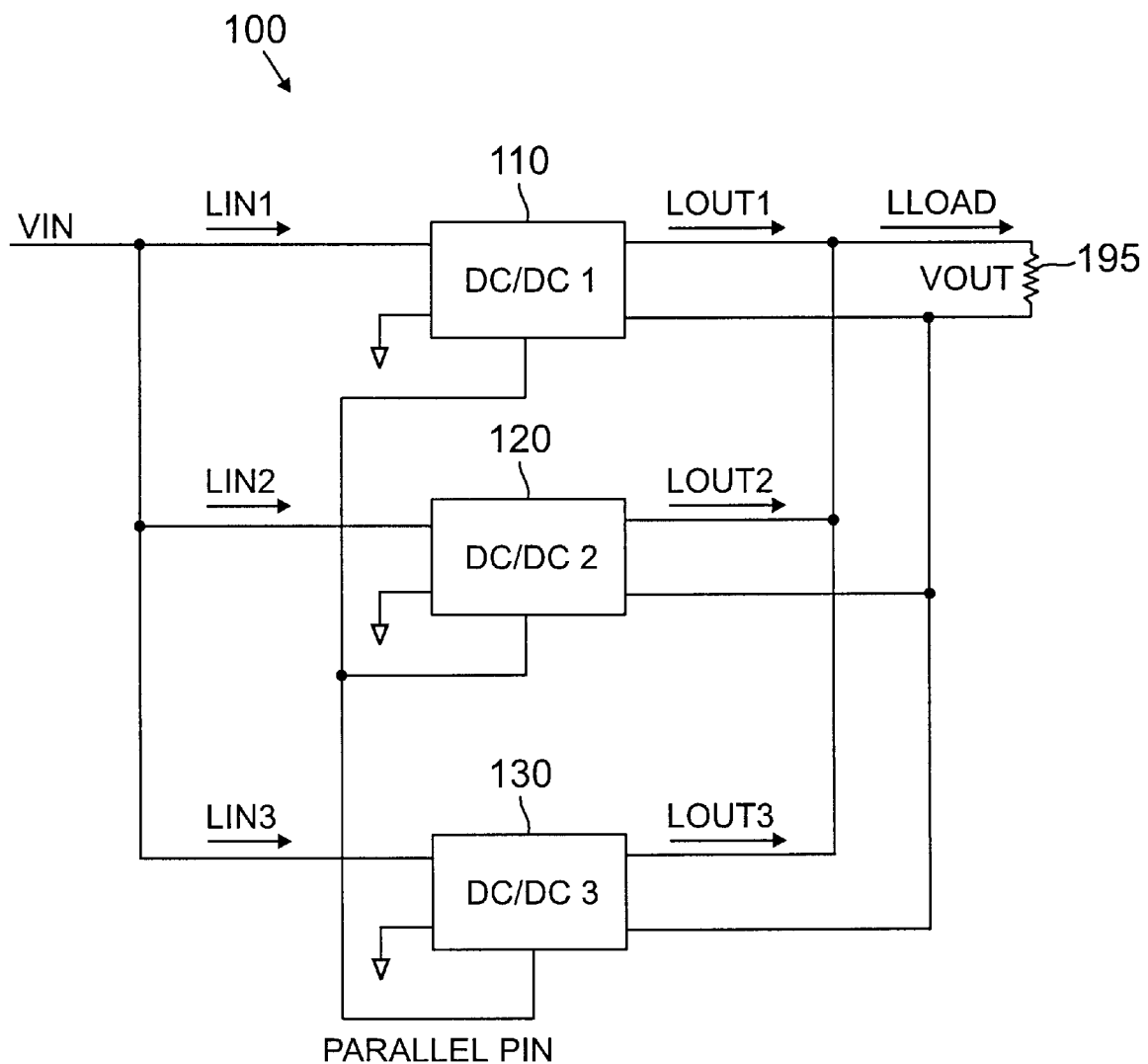
FIG. 1 illustrates a schematic diagram of a plurality of converters operating in a parallel forced load-sharing converter circuit.

FIG. 1 is a schematic diagram of a plurality of converters operating in a parallel forced load-sharing converter circuit 100. The circuit 100 comprises a first DC/DC converter 110, a second DC/DC converter 120 and a third DC/DC converter 130 configured for parallel operation. The DC/DC converters 110, 120, 130 function by converting a DC input voltage $V_{in}$ to alternating current ("AC") and converting the AC back into a DC output voltage $V_{out}$. The DC input voltage $V_{in}$ is applied across the input of the circuit 100 and an input current, $I_{in1}, I_{in2}, I_{in3}$ enters the DC/DC converters 110, 120, 130, respectively. In turn, an output current, $I_{out1}, I_{out2}, I_{out3}$ exits each DC/DC converter 110, 120, 130, respectively. A combined load current, $I_{load}$ and the DC output voltage $V_{out}$ are delivered across an output resistive load 195. The normal operating mode for converters operating with forced load-sharing is for each converter to provide an equal proportion of the load current. The parallel pins of the converters are connected together in a star connection, which provides the necessary feedback to actively equalize the load currents.

Figure 2:
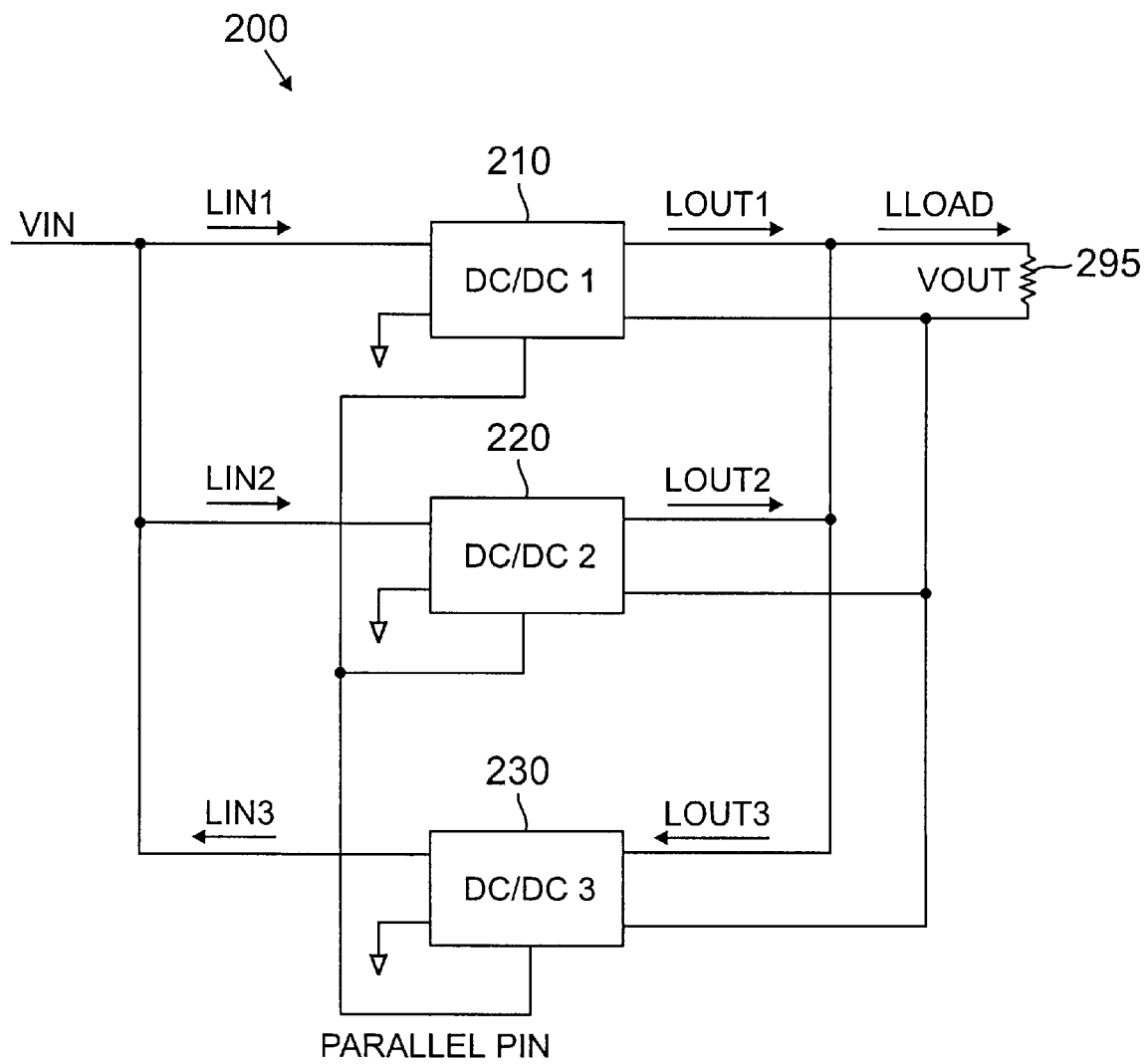
FIG. 2 illustrates a schematic diagram of a plurality of converters operating in a parallel forced load-sharing converter circuit with one converter processing power in a reverse direction.

Turning now to FIG. 2, illustrated is a schematic diagram of a plurality of converters operating in a parallel forced load-sharing converter circuit 200 with one converter processing power in a reverse direction. The circuit 200 comprises a first DC/DC converter 210, a second DC/DC converter 220 and a third DC/DC converter 230 configured for parallel operation. A voltage $V_{in}$ is applied across the input of the circuit 200 and an input current $I_{in1}, I_{in2}$ enters the first and second DC/DC converters 210, 220, respectively. However, an input current $I_{in3}$ is illustrated exiting the third DC/DC converter 230. An output current $I_{out1}, I_{out2}$ is illustrated exiting the first and second DC/DC converters 210, 220, respectively, but an output current $I_{out3}$ enters the third DC/DC converter 230 in a reverse direction. A combined load current $I_{load}$ and output voltage $V_{out}$ is delivered across an output resistive load 295.

In the illustrated embodiment, the first and second DC/DC converters 210, 220, are processing power in a normal, forward direction, while the third DC/DC converter 230 is processing power in the reverse direction. As previously mentioned, with one or more converters operating in this reverse power processing mode, the overall power system could be circulating large amounts of current while delivering very little current to the load. This results in a high power dissipation during lighter load conditions.

Figure 3:
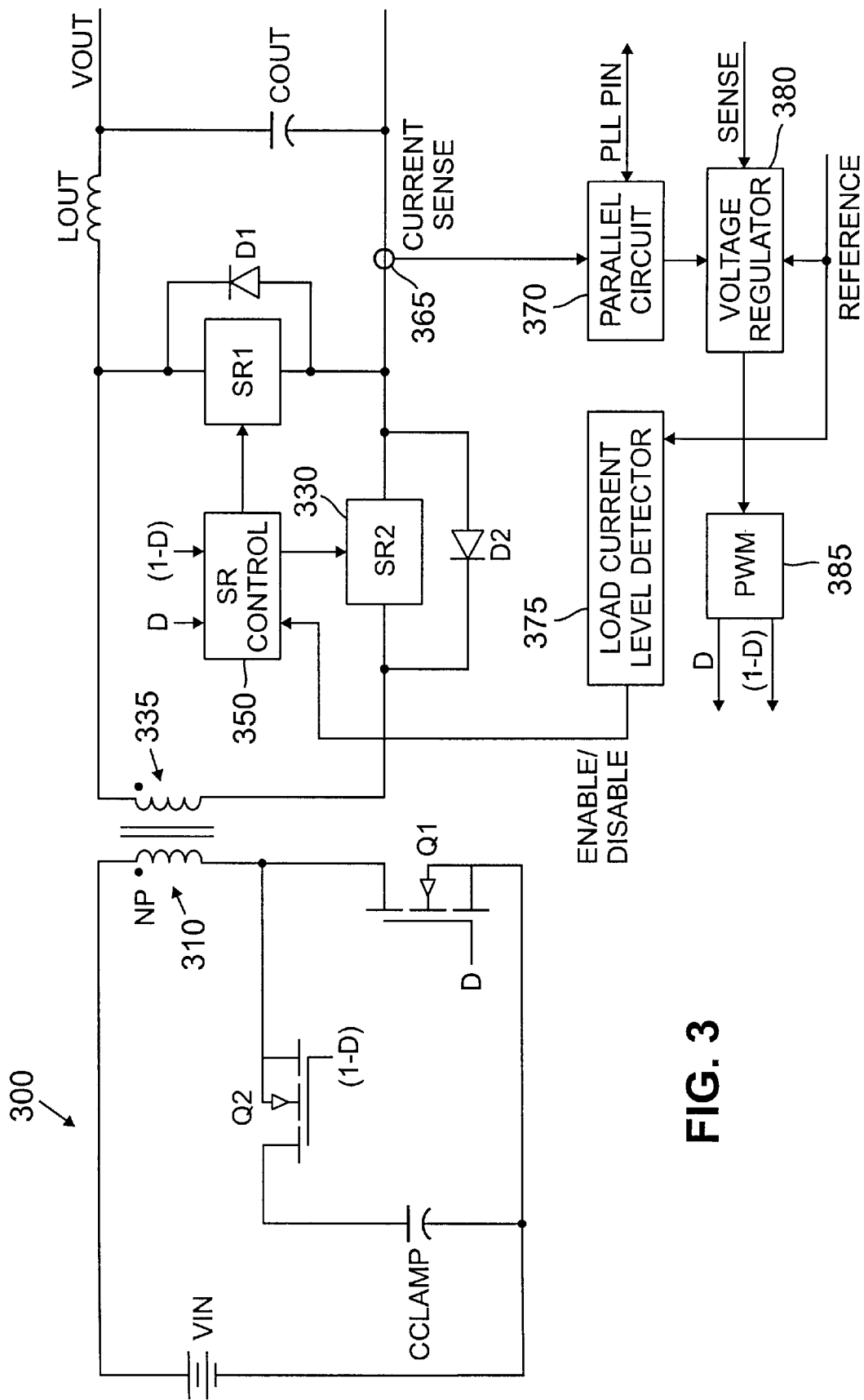
FIG. 3 illustrates a schematic diagram of a clamped-mode forward converter circuit with a synchronous rectifier circuit in accordance with U.S. patent application Ser. No. 08/343, 712.

Turning now to FIG. 3, illustrated is a schematic diagram of a clamped-mode forward converter circuit 300 with a synchronous rectifier circuit 330 in accordance with U.S.

patent application Ser. No. 08/343,712. The clamped-mode forward converter circuit 300 and its advantages are discussed in U.S. Pat. No. 5,303,138 to Rozman, issued on Apr. 12, 1994, entitled "Low Loss Synchronous Rectifier for Application to Clamped-Mode Power Converters" and incorporated herein by reference. The clamped-mode forward converter circuit 300 comprises a voltage input $V_{in}$ connected to a primary winding 310 of a power transformer by a power switch (e.g., MOSFET) Q1. The power switch Q1 is shunted by series connection of a clamp capacitor Cclamp and a power switch Q2. The conducting intervals of the power switch Q1 and the power switch Q2 are mutually exclusive. The duty cycle of the power switch Q1 is D and the duty cycle of the power switch Q2 is 1-D.

A secondary winding 335 of the power transformer is connected to an output capacitance load $C_{out}$ through an output filter inductor $L_{out}$ and the synchronous rectifier circuit 330, providing a substantially alternating current input to the synchronous rectifier circuit 330. The synchronous rectifier circuit 330 comprises control circuitry 350 and switching circuitry. A synchronous rectifier device SR1 and a synchronous rectifier device SR2 comprise the switching circuitry. The switching circuitry may be realized with any suitable rectifier devices, although a low $R_{DS(on)}$ N-channel MOSFET is suitable for such applications. A diode D1 and a diode D2 are discrete devices placed in parallel with the synchronous rectifier devices SR1, SR2, respectively. However, the diodes D1, D2 may represent an integral body diode of a N-channel MOSFET.

The synchronous rectifier control circuit 350 may be either a control driven circuit, or a self-synchronized drive circuit. Additionally, the overall power train topology encompasses any topology suitable for synchronous rectification, and is not limited to the topology shown in the illustrated embodiment.

The present invention also comprises a current sensing device 365 capable of sensing a converter output level. The current sensing device 365 encompasses a current transformer connected in series with the power switch Q1, a shunt resistor in series with the output, or a Hall effect current sense device in series with the output. The sensed current signal is then provided to a parallel control circuitry 370 to facilitate forced load-sharing.

The current signal is also provided to a level detector 375 which compares the load current to some predetermined reference level. When the converter is operating below some fraction of full rated load current, perhaps 5% or 10%, the detector 375 will disable the synchronous rectifier drive circuit 330. This action reconfigures the converter from a synchronous rectifier circuit to a conventional diode rectifier circuit. Since a diode rectifier circuit cannot process power in the reverse direction, the proposed circuit effectively prevents reverse power flow. When the converter output current increases beyond the 5% or 10% trip level (some hysteresis is probably preferred), the synchronous rectifier drive circuit 330 is enabled, resuming normal operation. Thus, the control circuit 350 transitions the switching circuitry SR1, SR2 from the bidirectional mode to the unidirectional mode when the output current level drops below a predetermined threshold level.

Note that the circuit retains the efficiency benefits of synchronous rectification at higher loads, where efficiency is most important. Reconfiguring the circuit to diode rectification at light loads prevents reverse power flow, but should not significantly impact light load efficiency. In fact, light load efficiency may be improved with diode rectification, as the overhead of the MOSFET gate drive loss (associated with the switching circuitry) is eliminated.

The remaining circuitry is standard for synchronous rectifier circuits configured for parallel operation. A voltage regulator 380 monitors the load and restores the output voltage $V_{out}$ to within tolerance limits despite changes in both the load and the input voltage $V_{in}$. A pulse-width modulation ("PWM") circuit 385 is included to keep the output voltage $V_{out}$ of the converter constant over the various operating conditions. Finally, the circuits are coupled as illustrated by the interconnecting lines and arrows, and the synchronous rectifier control circuitry 350 and the PWM circuit 385 are coupled to the clamped-mode circuit 300.

Even though the illustrated embodiment is designed to accommodate parallel operation, in certain applications the converter could be used in a stand alone configuration. In such applications it would be desirable to retain the benefits of reverse power flow afforded by synchronous rectification, such as the elimination of critical current problems. The load current level detector circuit 375 may be disabled during non-paralleled, or stand alone, operation. An additional circuit may then be incorporated into the design that senses parallel operation (e.g. ground the parallel pin when not in use) and disable the load current level detector circuit 375 during non-parallel operation.

Additionally, one skilled in the pertinent art should understand that the synchronous rectifier circuit 330 also transitions to the unidirectional mode of operation by disabling at least one of the synchronous rectifier devices SR1 or SR2. Therefore, by disabling synchronous rectifier device SR1, for instance, reverse power flow will be prevented in the synchronous rectifier drive circuit 330.

Figure 4:
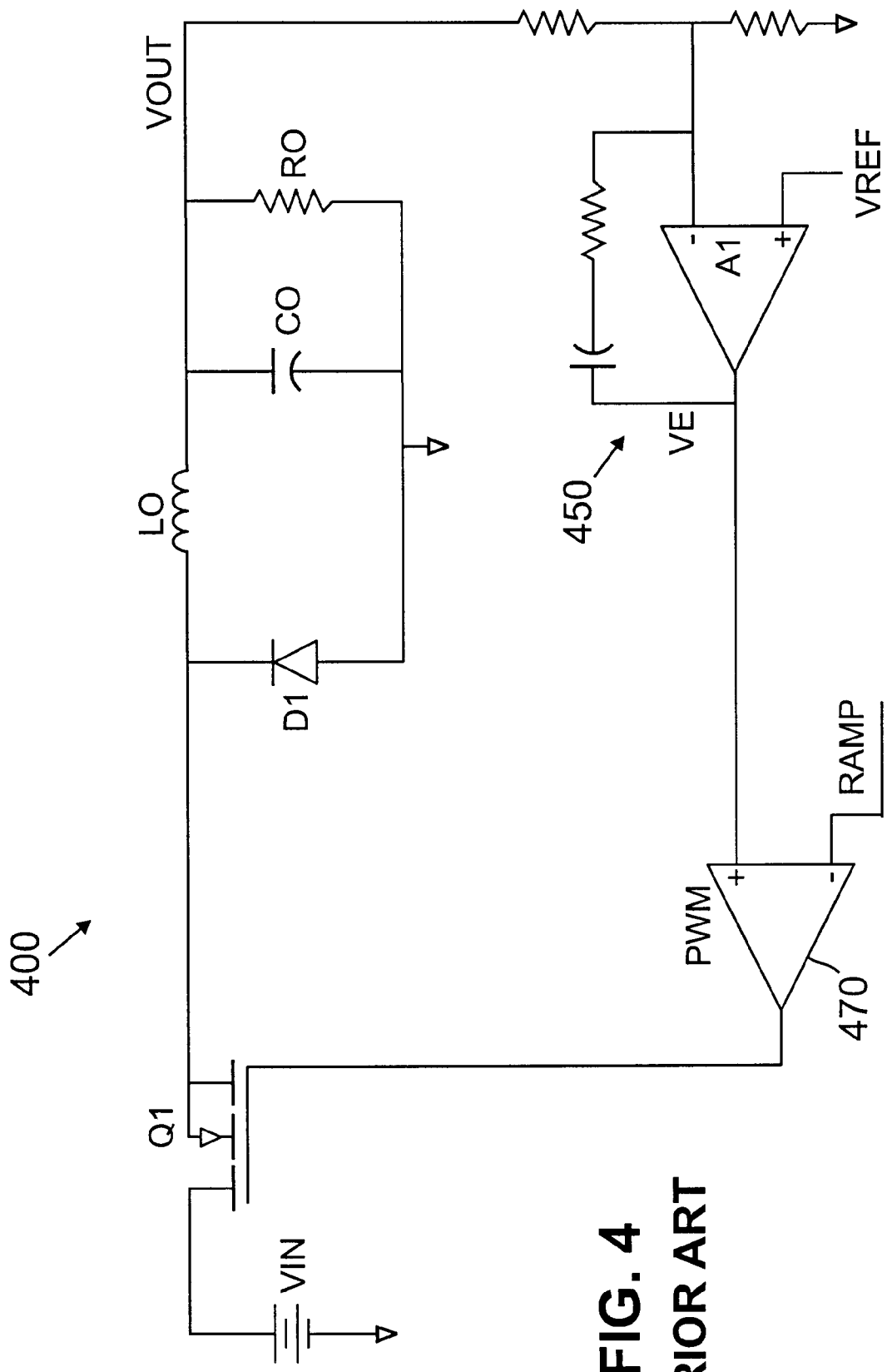
FIG. 4 illustrates a schematic diagram of a non-isolated buck converter with a diode rectifier.

Turning now to FIG. 4, illustrated is a schematic diagram of a non-isolated buck converter 400 with a diode rectifier D1. The non-isolated buck converter 400 includes a power switch Q1 analogous to the power switch Ql presented in FIG. 3. The non-isolated buck converter 400 also includes a capacitance load $C_o$ through a filter inductor $L_o$ and a resistive load $R_o$. The non-isolated buck converter 400 further includes a voltage regulator 450 to monitor the load and restore an output voltage $V_{out}$ to within tolerance limits despite changes in both the load and an input voltage $V_{in}$. The non-isolated buck converter 400 still further includes a PWM circuit 470 to keep the output voltage $V_{out}$ of the converter 400 constant over the various operating conditions. The non-isolated buck converter 400, employing a single diode rectifier D1 to provide a rectified output voltage $V_{out}$, does not endure reverse power flow conditions. However, a significant increase in power converter efficiency can be achieved by replacing the rectifier diode D1 with a synchronous rectifier circuit as described with respect to FIG. 5.

Figure 5:
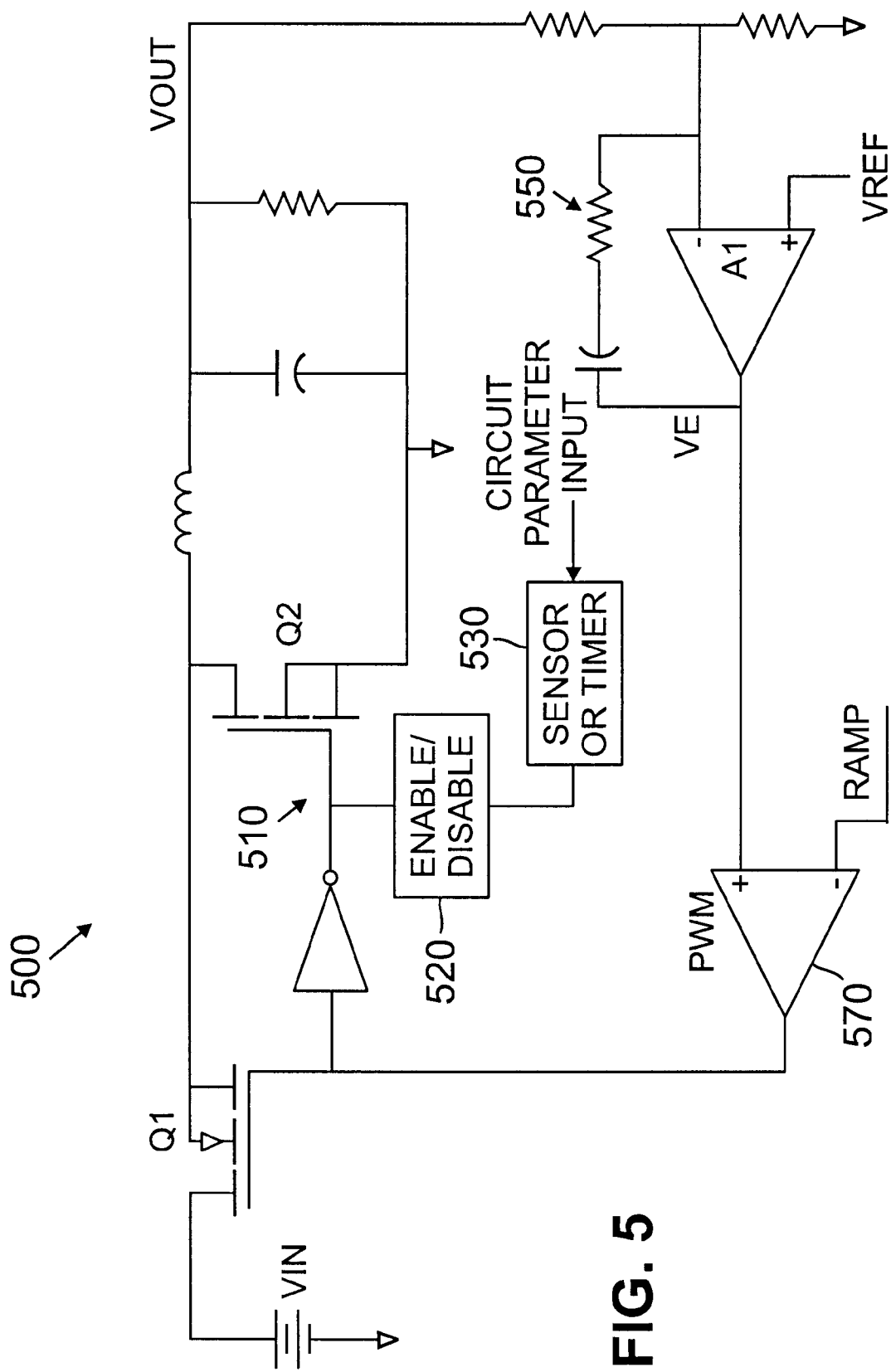
FIG. 5 illustrates a schematic diagram of a non-isolated buck converter with a synchronous rectifier circuit employing the principles of the present invention.

Turning now to FIG. 5, illustrated is a schematic diagram of a non-isolated buck converter ("buck converter") 500 with a synchronous rectifier circuit 510 employing the principles of the present invention. Analogous to FIG. 4, the buck converter 500 includes a power switch Q1, capacitance load $C_o$, filter inductor $L_o$, resistive load $R_o$, voltage regulator 550 and PWM circuit 570. The synchronous rectifier circuit 510 includes control circuitry 520 and switching circuitry. A switch (e.g., MOSFET) Q2 comprises the switching circuitry. The switching circuitry may be realized with any suitable rectifier devices including a low $R_{DS(on)}$ N-channel MOSFET with an integral body diode of the N-channel MOSFET. The switch Q2 is capable of carrying bidirectional current and the buck converter 500 is susceptible to bidirectional power flow. To prevent the bidirectional power flow, the switch Q2 may be disabled through the control circuitry 520 coupled to a sensing device 530. Analogous to rectifier circuit of FIG. 3, the rectifier transitions from the bidirectional mode to the unidirectional mode of operation by disabling switch Q2 (analogous to disabling synchronous rectifier device SR1 in FIG. 3). The bidirectional power flow is prevented in the buck converter 500 by replacing the switch Q2 with a diode or by disabling the switch Q2 and relying on its integral body diode.

The control circuitry 520 may be either a control driven circuit, or a self-synchronized drive circuit. Additionally, the overall power train topology encompasses any topology suitable for synchronous rectification including, without limitation, transformer isolated topologies, and is not limited to the topology shown in the illustrated embodiment.

When considering reverse power flow in a synchronous rectifier, it is important to understand the distinction between instantaneous and average reverse power flow. Instantaneous reverse power (or inductor current) flow may be defined as negative power (or current) flow for only a portion of each switching cycle. The current does not remain negative for an entire switching cycle. Average reverse power (or inductor current) flow may be defined as a net negative current averaged over more than one switching cycle. During a start-up or shut-down transient, for example, average negative current could be maintained for several switching cycles prior to the current settling out in steady state, but need not remain negative continuously.

Figure 6:
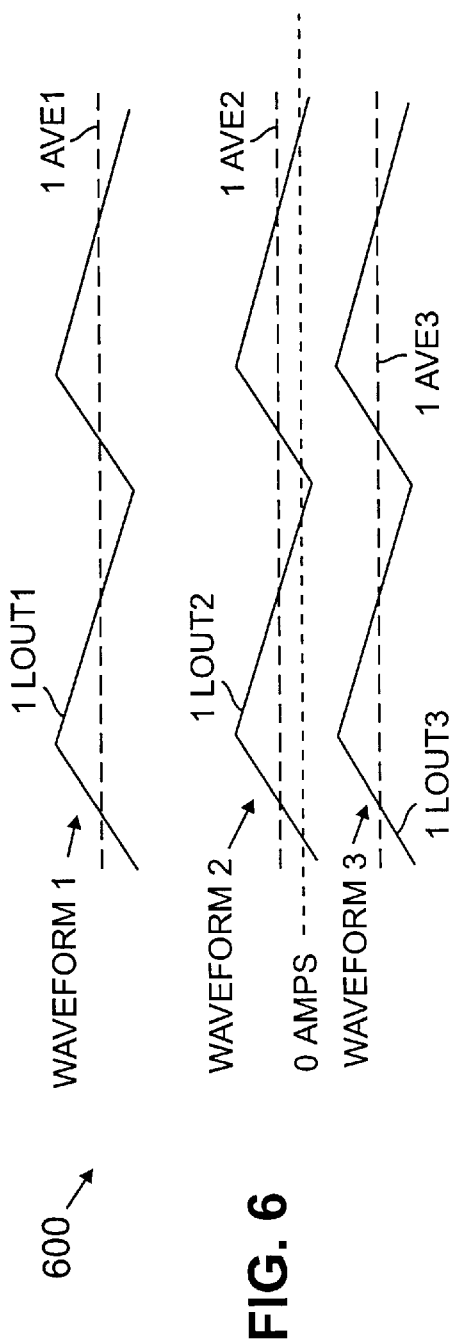
FIG. 6 illustrates a graphical representation of an average and instantaneous inductor current of the non-isolated buck converter of FIG. 5.

Turning now to FIG. 6, illustrated is a graphical representation 600 of an average and instantaneous inductor current of the buck converter 500 of FIG. 5. Waveform 1 of the graphical representation 600 illustrates a condition where an average inductor current I ave1 and instantaneous inductor current I Lout1 are positive. This circumstance represents a normal operating condition for the buck converter 500 (e.g, full load).

Turning now to waveform 2, illustrated is a condition where the average inductor current I ave2 is positive, but the instantaneous inductor current I Lout2 is negative for a portion of each switching cycle. In this circumstance, it is often desirable to allow the instantaneous inductor current I Lout2 to flow as it prevents discontinuous inductor current and the associated detrimental effects on the control loop. It is not detrimental to the operation of two or more units in parallel to allow instantaneous negative inductor current I Lout2 for a portion of each cycle. It is important, however, to prevent large values of negative average current I ave2, as this may cause excessive power dissipation, a glitch on the bus voltage or other performance problems.

Turning now to waveform 3, illustrated is negative average inductor current I ave3 and negative instantaneous inductor current I Lout3. A relatively small amount of negative average current flow I ave3 (e.g., –1% to –5%) is not significantly detrimental to the operation of two or more units in parallel. Generally, it is desirable to prevent substantial negative average inductor current, while a small amount of negative instantaneous inductor current is considered acceptable and possibly even advantageous depending on the operating conditions of the converter.

With continuing reference to the preceding FIGUREs, a system of parallel synchronous rectifier power converters generally operate as follows. The synchronous rectifiers can be characterized as ideal voltage sources capable of bidirectional power flow. Each of the ideal voltage sources has a unique voltage setpoint established by the tolerance of the internal reference and resistors, etc. The ideal voltage sources can be connected in parallel by essentially adjusting the setpoint voltages of each converter to be identical. Even a small difference in setpoint voltages may cause a large current to flow from the higher setpoint converter into the lower setpoint converter (as illustrated in FIG. 2). Therefore, because there will always be some finite difference in setpoint voltages between converters due to unavoidable manufacturing variations, an additional control circuit (as disclosed in the present invention) is suggested to actively equalize the setpoints of each parallel converter during steady state operation. For a better understanding of paralleled converters see U.S. Pat. No. 5,036,452, entitled "Current Sharing Control With Limited Output Voltage Range for Paralleled Power Converters," to Loftus, issued on Jul. 30, 1991, commonly assigned with the present invention and is incorporated herein by reference.

Another way to consider the reverse power flow problem is to examine the relationship between input and output voltage during both forward and reverse power flow. The equation relating input voltage and output voltage for the buck converter 500 of FIG. 5 is:

$$Vo = Vin\ D \text{ (forward power flow)} \qquad [1]$$

where D is the duty ratio of the buck converter 500. When processing power in the reverse direction, the buck converter 500 of FIG. 5 performs a boost function from the output back to the input, and conforms to the following equation:

$$Vin = Vo/D \text{ (reverse power flow)}. \qquad [2]$$

It is apparent from the above equations that a small value (approaching zero) for the duty cycle (D) in the forward power flow direction results in very little forward power flow. However, a small value of the duty cycle (D) in the reverse power flow mode results in an extremely large reverse power flow. Thus, if there is a significant mismatch in duty ratio for two converters operating in parallel, the reverse power flow will probably occur in the converter with the lower duty ratio.

The synchronous rectifier circuit 510 of FIG. 5 may also be employed in a system with a plurality of converters, each converter having a rectifier therein. The synchronous rectifier circuit 510 actively measures a characteristic of the buck converter 500, then actively equalizes the duty ratios of a plurality of converters to equalize the setpoint voltages (and hence the output). In such a parallel arrangement, the synchronous rectifier circuit 510 is capable of preventing reverse power flow only when it is operating within its active range. However, the active operating range is limited by design and there are times that the converters will not be operating within the active range. With the system operating outside of its active range, the duty ratios of the converters can diverge, leading to a divergence in setpoint voltages and hence a reverse power flow condition. This condition may occur, without limitation, during start-up (during hot plug in or by enabling the on/off pin of the converter, etc.), during recovery from an overvoltage or overcurrent condition or during an extreme line or load transient or when the converter is shut-off. It is particularly important that reverse power flow be actively prevented during these operating conditions (i.e., non steady state) as well.

A method for preventing reverse power flow is illustrated with respect to FIG. 5. For example, the control circuitry 520 may be triggered by inferring output current without a direct measurement of the output current. In a typical power converter, there are many intermediate control signals that are proportional to output current (for instance, the error amplifier voltage Ve of FIG. 5). The duty ratio of the converter could also be measured to infer the output level of the converter (see U.S. Pat. No. 4,371,919, to Andrews, et al., entitled "Load Distribution Among Parallel DC-DC Converters," issued on Feb. 1, 1983, commonly assigned with the present invention and incorporated herein by reference). Under steady state operation, the duty ratio will be confined to a predictable range. If the duty ratio is below the steady state range (or above the range in some topologies), reverse power flow may occur. Detection of the duty ratio could, therefore, be used to disable at least one of the synchronous rectifiers to prevent reverse power flow.

Figure 7:
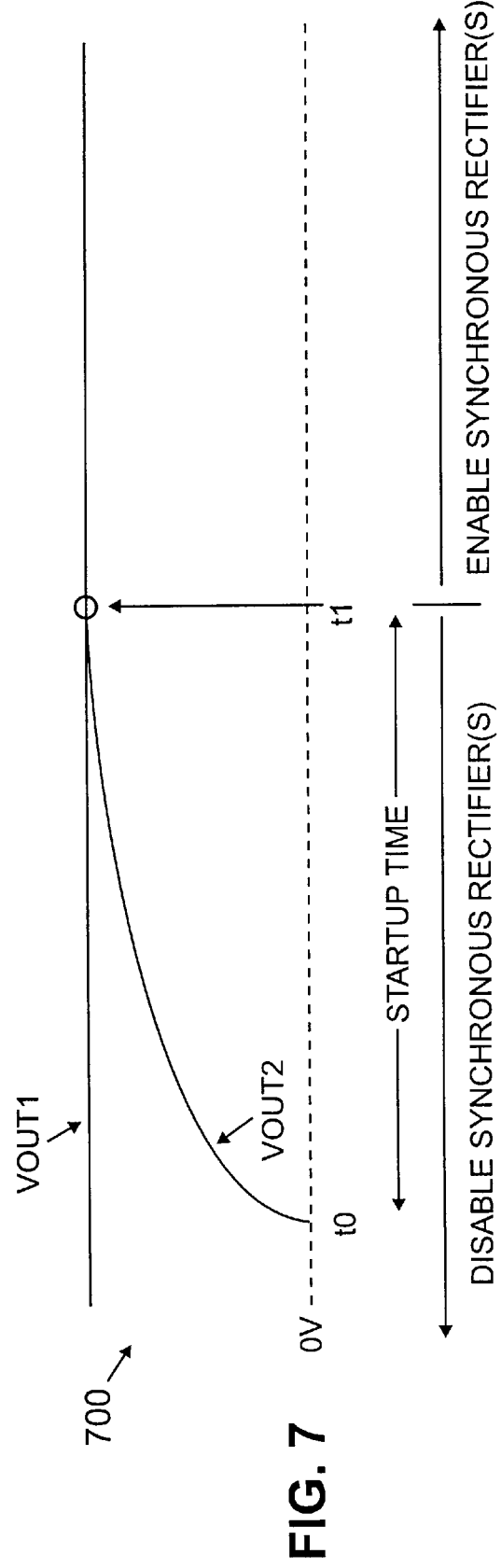
FIG. 7 illustrates a timing diagram of a start-up sequence for a plurality of converters operating in a parallel forced load-sharing converter circuit.

Turning now to FIG. 7, illustrated is a timing diagram 700 of a start-up sequence for a plurality of converters operating in a parallel forced load-sharing converter circuit (or system). The synchronous rectifiers of the converters are enabled as a function of time to prevent reverse power flow for the converter circuit. This technique may be especially effective during start-up, where a synchronous rectifier is particularly susceptible to reverse power flow. The timing diagram 700 illustrates a typical start-up sequence that could occur during, for instance, a hot plug-in condition. A voltage curve Vout1 represents the voltage level of one or more power converters already operating in the converter system. A voltage curve Vout2 represents the voltage level of an additional power converter being added to the converter system. At a time t0, the additional power converter is enabled and begins its soft start sequence. At a time t1, the converter system reaches steady state, with all power converters at the same voltage level. Note that the voltage levels Vout1, Vout2 may represent the relative duty ratios of the converters in the system, since the duty ratio is proportional to the voltage in the converters. The additional converter is susceptible to reverse power flow for the period before the time t1. Therefore, it is desirable to disable the synchronous rectifier(s) for the period up to time t1.

Several different stimuli may initiate module start-up, including the input voltage exceeding the under voltage lock out ("UVLO") trip point or the On/Off control of the converter being toggled. Consequently, the "input" to the control circuit 520 illustrated in FIG. 5 employed to trigger a timer could be a variety of signals including, without limitation, toggling of a logic state, initiation of the drive pulse train or input voltage level.

Beyond the time t1, the converter system is in steady state and the synchronous rectifier(s) may be enabled to improve system efficiency. As previously mentioned, the current share circuit could be used to prevent reverse power flow during steady state operation. One skilled in the pertinent art should understand the design and operation of conventional timing circuits and such circuits may be employed in a power converter in a variety of ways including, without limitation, with the time constant of the circuit being a function of predictable circuit parameters.

Note that the above described timer and duty ratio detection methods are actually nothing more than inference methods. One skilled in the pertinent art should be adept at predicting when a converter is susceptible to reverse power flow and disable the synchronous rectifier(s) during these periods of susceptibility. As a result, the reverse power flow is prevented, not through a direct measurement of the output level, but rather through a prediction of an output level or intermediate control point based on a knowledge of the system operation.

Figure 8:
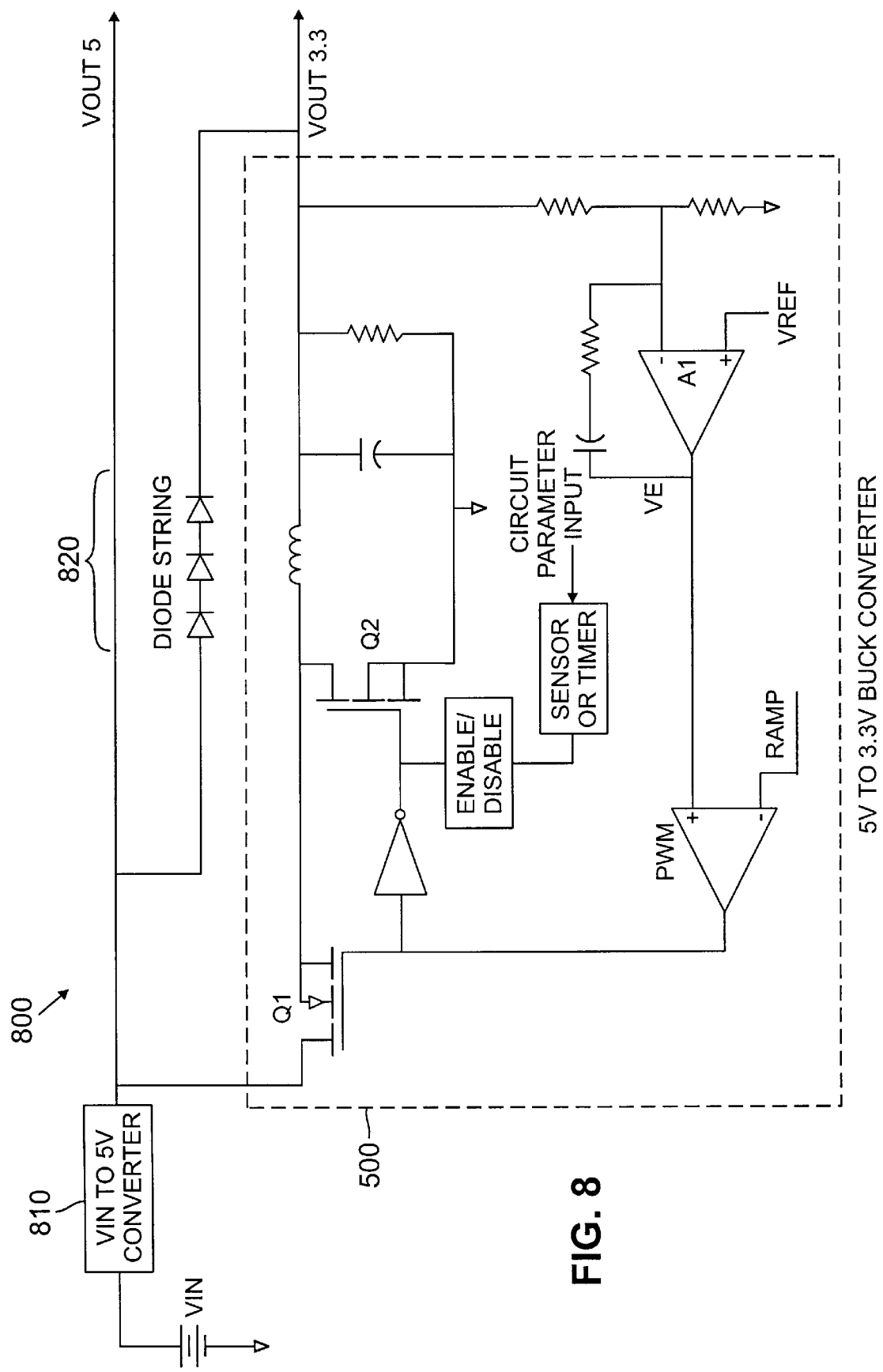
FIG. 8 illustrates a schematic diagram of the converter of FIG. 5 employed in a system employing a plurality of converters.

Turning now to FIG. 8, illustrated is a schematic diagram of the buck converter 500 of FIG. 5 employed in a system 800 employing a plurality of converters. In some applications, the load requires more than one voltage level for operation (e.g., 5 volts ("V") and 3.3V). In these applications, two separate supplies may be employed where a first converter 810 supplies 5V and another converter, the buck converter 500, processes the 5V down to 3.3V. The start-up timing between the two converters 500, 810 in these applications is critical. If the 5V and 3.3V power rails of the system diverge, the load (e.g., an integrated circuit) may latch-up or possibly be damaged. Therefore, tight control between the start-up timing between the two converters 500, 810 is desirable. One implementation to handle this situation is disclosed in the power system 800.

In the power system 800, the isolated DC to 5V converter 810 provides 5V to the load, but also provides the input power to the 5V to 3.3V buck converter 500. The start-up timing is such that the 5V converter 810 starts first and the buck converter 500 starts when its input voltage exceeds an internal UVLO, usually 3.0 to 4.5 volts. To insure that the rails are never more than about 2.5V apart, a diode string 820 is used to actively pull up the 3.3V output as the 5V output rises. Once the 3.3V buck converter 500 reaches steady state, the diode string 820 is reverse biased and ceases to conduct current.

Figure 9:
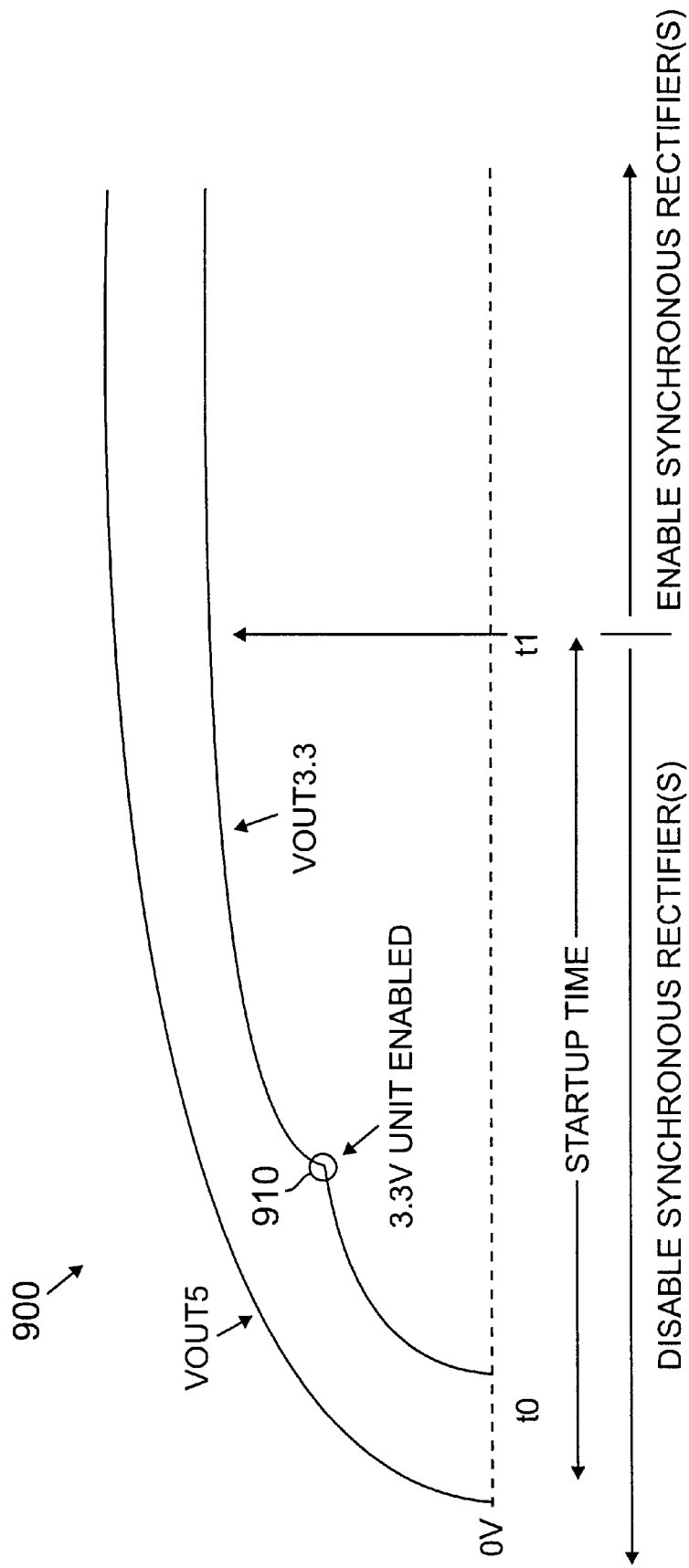
FIG. 9 illustrates a timing diagram of a start-up sequence for the system of FIG. 8.

Turning now to FIG. 9, illustrated is a timing diagram 900 of a start-up sequence for the system 800 of FIG. 8. In the power system 800, the converters 500, 810 are connected in parallel and sharing the 3.3 V load during some portion of the start-up time. When the converters 500, 810 reach steady state, they are no longer connected in parallel. However, during the time that the two converters 500, 810 are in parallel, they are susceptible to reverse power flow. At the instant the buck converter 500 is enabled (designated at point 910), the converter 810 exhibits a zero duty ratio. During a zero duty ratio condition, the switch Q2 is configured on initially, thereby effectively shorting the 3.3V output to ground.

Although this type of buck converter 500 is usually designed to start quickly, the short time that the buck converter 500 spends at low duty ratio will still glitch the 3.3V output (and possibly the 5V output), possibly damaging the IC. It is desirable, therefore, that the switch Q2 be configured off during the time that the buck converter 500 is susceptible to reverse power flow (pertaining to the period of time that the converters 500, 810 reach steady state). This may be accomplished in a variety of ways including, without limitation, indirectly measuring the output level, measuring an intermediate control voltage, inferring the output level or using a simple timing circuit with the time constant designed to conform to circuit parameters.

One consideration in employing a timing circuit is the possibility that the converter 500 may operate at a light load condition whereby the inductor current is discontinuous with diode rectification. In such a circumstance, transitioning from diode rectification to synchronous rectification at a time t1 results in a change in the operation of the converter 500 (i.e., from a discontinuous conduction mode to a continuous conduction mode) resulting in a shift of the operating point for the control thereof. Abruptly enabling the switch Q2 during this period of time results in a glitch at the output of the converter 500 while the control stabilizes at a new operating point. The disruption can be avoided by soft starting the drive signal to the switch Q2 thereby gradually increasing its duty cycle from zero to its ultimate operating point. An analogous soft start may be employed for the current sensing embodiments, particularly, if the load current threshold is set below the point at which the diode rectifier circuit transitions to the discontinuous inductor current mode. The timing circuits include, without limitation, an enable/disable timing device and a soft start implementation where the duty ratio is increased from a small value to its ultimate operating point.

The system of the present invention is especially applicable when the converters 500, 810 are in parallel (i.e., during start-up). However, as previously mentioned, start-up is one of the most critical times in which synchronous rectifiers are susceptible to reverse power flow.

Even though the illustrated embodiment is designed to accommodate parallel operation, in certain applications the converter could be used in a stand alone configuration. In such applications it would be desirable to retain the benefits of reverse power flow afforded by synchronous rectification, such as the elimination of critical current problems.

Additionally, one skilled in the pertinent art should understand that in a synchronous rectifier circuit employing a plurality of switches, the transition to the unidirectional mode of operation may be accommodated by disabling at least one of the switches therein. Therefore, by disabling at least one switch, for instance, reverse power flow will be prevented in the synchronous rectifier circuit. The control circuit of the present invention as described herein is applicable to any converter topology including isolated and non-isolated topologies.

Although the present invention has been described in detail, those skilled in the art should understand that they can make various changes, substitutions and alterations herein without departing from the spirit and scope of the invention in its broadest form.

What is claimed is:

1. A power supply, comprising:
   switching circuitry including at least one synchronous rectifier device and adapted to operate in a selected one of (a) an active bi-directional mode of operation when enabled and (b) an inactive unidirectional mode of operation when disabled, said switching circuitry thereby rectifying substantially alternating current to produce substantially direct current; and
   synchronous rectifier control circuitry capable of enabling and disabling said switching circuitry as a function of a characteristic associated with said power supply and adapted to transition said switching circuitry from said active bi-directional mode to said inactive unidirectional mode of operation by gradually decreasing a conduction interval of said at least one synchronous rectifier device thereby reducing a disruption in an output of said power supply while said switching circuitry is transitioning from said active bi-directional mode to said inactive unidirectional mode of operation.

2. The power supply as recited in claim 1, further comprising:
   a power transformer having primary and secondary windings, said secondary winding being coupled to said switching circuitry; and
   at least one power switch occasionally coupling said primary winding to a source of electrical power.

3. The power supply as recited in claim 2 further comprising a clamping circuit, coupled to said power transformer, adapted to limit a voltage across said power transformer during at least a portion of a non-conduction interval of said at least one power switch.

4. The power supply as recited in claim 1 wherein said switching circuitry comprises metal oxide semiconductor field effect transistor (MOSFET) switches.

5. The power supply as recited in claim 1 wherein said power supply is parallel-coupled to a second power supply, said synchronous rectifier control circuitry adapted to disable said switching circuitry thereby preventing said second power supply from causing said substantial reverse power flow.

6. The power supply as recited in claim 5 further comprising an active load-sharing circuit that effects load sharing between said power supply and said second power supply.

7. The power supply as recited in claim 1 wherein said switching circuitry comprises discrete diodes to allow said switching circuitry to operate in said inactive unidirectional mode of operation.

8. The power supply as recited in claim 1 wherein said switching circuitry comprises a plurality of synchronous rectifier devices, said synchronous rectifier control circuitry adapted to disable all of said plurality of synchronous rectifier devices.

9. The power supply as recited in claim 1 further comprising detection circuitry capable of detecting parallel operation between said power supply and a second power supply, said detection circuitry allowing said synchronous rectifier control circuitry to disable said switching circuitry only when said power supply is parallel-coupled to said second power supply.

10. A power supply, comprising:
    switching circuitry including at least one synchronous rectifier device and adapted to operate in a selected one of (a) an active bi-directional mode of operation when enabled and (b) an inactive unidirectional mode of operation when disabled, said switching circuitry thereby rectifying substantially alternating current to produce substantially direct current; and
    synchronous rectifier control circuitry capable of enabling and disabling said switching circuitry as a function of a characteristic associated with said power supply and adapted to transition said switching circuitry from said inactive unidirectional mode to said active bi-directional mode of operation by gradually increasing a conduction interval of said at least one synchronous rectifier device thereby reducing a disruption in an output of said power supply while said switching circuitry is transitioning from said inactive unidirectional mode to said active bi-directional mode of operation.

11. The power supply as recited in claim 10, further comprising:
    a power transformer having primary and secondary windings, said secondary winding being coupled to said switching circuitry; and
    at least one power switch occasionally coupling said primary winding to a source of electrical power.

12. The power supply as recited in claim 11 further comprising a clamping circuit, coupled to said power transformer, adapted to limit a voltage across said power transformer during at least a portion of a non-conduction interval of said at least one power switch.

13. The power supply as recited in claim 10 wherein said switching circuitry comprises metal oxide semiconductor field effect transistor (MOSFET) switches.

14. The power supply as recited in claim 10 wherein said power supply is parallel-coupled to a second power supply, said synchronous rectifier control circuitry adapted to disable said switching circuitry thereby preventing said second power supply from causing said substantial reverse power flow.

15. The power supply as recited in claim 14 further comprising an active load-sharing circuit that effects load sharing between said power supply and said second power supply.

16. The power supply as recited in claim 10 wherein said switching circuitry comprises discrete diodes to allow said switching circuitry to operate in said inactive unidirectional mode of operation.

17. The power supply as recited in claim 10 wherein said switching circuitry comprises a plurality of synchronous rectifier devices, said synchronous rectifier control circuitry adapted to disable all of said plurality of synchronous rectifier devices.

18. The power supply as recited in claim 10 further comprising detection circuitry capable of detecting parallel operation between said power supply and a second power supply, said detection circuitry allowing said synchronous rectifier control circuitry to disable said switching circuitry only when said power supply is parallel-coupled to said second power supply.

19. A method for controlling a synchronous rectifier circuit in a power supply, comprising:

providing switching circuitry including at least one synchronous rectifier device and adapted to operate in a selected one of (a) an active bi-directional mode of operation when enabled and (b) an inactive unidirectional mode of operation when disabled, said switching circuitry thereby rectifying substantially alternating current to produce substantially direct current; and employing synchronous rectifier control circuitry to enable and disable said switching circuitry as a function of a characteristic associated with said power supply and transition said switching circuitry between said active bi-directional mode to said inactive unidirectional mode of operation by gradually varying a conduction interval of said at least one synchronous rectifier device thereby reducing a disruption in an output of said power supply while said switching circuitry is transitioning between said active bi-directional mode and said inactive unidirectional mode of operation.

20. The method as recited in claim 19, further comprising:

providing a power transformer having primary and secondary windings;

occasionally coupling said primary winding to a source of electrical power with at least one power switch;

coupling said switching circuitry to said secondary winding; and limiting a voltage across said power transformer during at least a portion of a non-conduction interval of said at least one power switch.

21. The method as recited in claim 19 further comprising:

parallel-coupling said power supply to a second power supply;

allowing said synchronous rectifier control circuitry to disable said control driven switching circuitry thereby preventing said second power supply from causing said substantial reverse power flow; and effecting load sharing between said power supply and said second power supply.

22. The method as recited in claim 19 wherein said switching circuitry comprises discrete diodes to allow said control driven switching circuitry to operate in said inactive unidirectional mode of operation.

23. The method as recited in claim 19 wherein said switching circuitry comprises a plurality of synchronous rectifier devices, said synchronous rectifier control circuitry adapted to disable all of said plurality of synchronous rectifier devices.

24. The method as recited in claim 19 further comprising detecting parallel operation between said power supply and a second power supply, said synchronous rectifier control circuitry adapted to disable said switching circuitry only when said power supply is parallel-coupled to said second power supply.

25. A power supply, comprising:

switching circuitry including at least one synchronous rectifier device and adapted to operate in a selected one of (a) an active bi-directional mode of operation when enabled and (b) an inactive unidirectional mode of operation when disabled, said switching circuitry thereby rectifying substantially alternating current to produce substantially direct current;

a timing circuit capable of developing a control signal as a function of a time period of said power supply; and synchronous rectifier control circuitry capable of enabling and disabling said switching circuitry as a function of a characteristic associated with said power supply and adapted to employ said control signal to disable said at least one synchronous rectifier device during a substantial portion of a start-up period of said power supply thereby to prevent substantial reverse power flow through said power supply.

26. The power supply as recited in claim 25 further comprising:

a power transformer having primary and secondary windings, said secondary winding being coupled to said switching circuitry; and at least one power switch occasionally coupling said primary winding to a source of electrical power.

27. The power supply as recited in claim 26 further comprising a clamping circuit, coupled to said power transformer, adapted to limit a voltage across said power transformer during at least a portion of a non-conduction interval of said at least one power switch.

28. The power supply as recited in claim 25 wherein said switching circuitry comprises metal oxide semiconductor field effect transistor (MOSFET) switches.

29. The power supply as recited in claim 25 wherein said power supply is parallel-coupled to a second power supply, said synchronous rectifier control circuitry adapted to disable said switching circuitry thereby preventing said second power supply from causing said substantial reverse power flow.

30. The power supply as recited in claim 29 further comprising an active load-sharing circuit that effects load sharing between said power supply and said second power supply.

31. The power supply as recited in claim 25 wherein said switching circuitry comprises discrete diodes to allow said switching circuitry to operate in said inactive unidirectional mode of operation.

32. The power supply as recited in claim 25 wherein said switching circuitry comprises a plurality of synchronous rectifier devices, said synchronous rectifier control circuitry adapted to disable all of said plurality of synchronous rectifier devices.

33. The power supply as recited in claim 25 further comprising detection circuitry capable of detecting parallel operation between said power supply and a second power supply, said detection circuitry allowing said synchronous rectifier control circuitry to disable said switching circuitry only when said power supply is parallel-coupled to said second power supply.

34. A method for controlling a synchronous rectifier circuit in a power supply, comprising:

providing switching circuitry including at least one synchronous rectifier device and adapted to operate in a selected one of (a) an active bi-directional mode of operation when enabled and (b) an inactive unidirectional mode of operation when disabled, said switching circuitry thereby rectifying substantially alternating current to produce substantially direct current;

developing a control signal with a timing circuit as a function of a time start-up period of said power supply; and employing synchronous rectifier control circuitry to enable and disable said switching circuitry as a function of a characteristic associated with said power supply and apply said control signal to disable said at least one synchronous rectifier device during a substantial portion of a start-up period of said power supply thereby to prevent substantial reverse power flow through said power supply.

35. The method as recited in claim 34, further comprising:

providing a power transformer having primary and secondary windings;

occasionally coupling said primary winding to a source of electrical power with at least one power switch;

coupling said switching circuitry to said secondary winding; and limiting a voltage across said power transformer during at least a portion of a non-conduction interval of said at least one power switch.

36. The method as recited in claim 34, further comprising:

parallel-coupling said power supply to a second power supply;

allowing said synchronous rectifier control circuitry to disable said control driven switching circuitry thereby preventing said second power supply from causing said substantial reverse power flow; and effecting load sharing between said power supply and said second power supply.

37. The method as recited in claim 34 wherein said switching circuitry comprises discrete diodes to allow said control driven switching circuitry to operate in said inactive unidirectional mode of operation.

38. The method as recited in claim 34 wherein said switching circuitry comprises a plurality of synchronous rectifier devices, said synchronous rectifier control circuitry adapted to disable all of said plurality of synchronous rectifier devices.

39. The method as recited in claim 34 further comprising detecting parallel operation between said power supply and a second power supply, said synchronous rectifier control circuitry adapted to disable said switching circuitry only when said power supply is parallel-coupled to said second power supply.

40. A power supply, comprising:

at least one power switch that continuously and periodically conducts at a duty cycle (D) to couple an input of said power supply to a source of electrical power;

switching circuitry including at least one synchronous rectifier device and adapted to operate in a selected one of (a) an active bi-directional mode of operation when enabled and (b) an inactive unidirectional mode of operation when disabled, said switching circuitry thereby rectifying substantially alternating current to produce substantially direct current;

a sensor capable of sensing said duty cycle (D) of said at least one power switch;

a level detector capable of comparing said duty cycle (D) with a threshold duty cycle and developing a control signal in accordance therewith; and synchronous rectifier control circuitry, coupled to said level detector, capable of enabling and disabling said switching circuitry as a function of a characteristic associated with said power supply and adapted to employ said control signal to disable said at least one synchronous rectifier device when said duty cycle (D) drops below said threshold duty cycle thereby to prevent substantial reverse power flow through said power supply.

41. The power supply as recited in claim 40, further comprising:

a power transformer having a primary winding coupled to said at least one power switch and a secondary winding coupled to said switching circuitry.

42. The power supply as recited in claim 41 further comprising a clamping circuit, coupled to said power transformer, adapted to limit a voltage across said power transformer during at least a portion of a non-conduction interval of said at least one power switch.

43. The power supply as recited in claim 40 wherein said switching circuitry comprises metal oxide semiconductor field effect transistor (MOSFET) switches.

44. The power supply as recited in claim 40 wherein said power supply is parallel-coupled to a second power supply, said synchronous rectifier control circuitry adapted to disable said switching circuitry thereby preventing said second power supply from causing said substantial reverse power flow.

45. The power supply as recited in claim 44 further comprising an active load-sharing circuit that effects load sharing between said power supply and said second power supply.

46. The power supply as recited in claim 40 wherein said switching circuitry comprises discrete diodes to allow said switching circuitry to operate in said inactive unidirectional mode of operation.

47. The power supply as recited in claim 40 wherein said switching circuitry comprises a plurality of synchronous rectifier devices, said synchronous rectifier control circuitry adapted to disable all of said plurality of synchronous rectifier devices.

48. The power supply as recited in claim 40 further comprising detection circuitry capable of detecting parallel operation between said power supply and a second power supply, said detection circuitry allowing said synchronous rectifier control circuitry to disable said switching circuitry only when said power supply is parallel-coupled to said second power supply.

49. A method for controlling a synchronous rectifier circuit in a power supply, comprising:

employing at least one power switch that continuously and periodically conducts at a duty cycle (D) to couple an input of said power supply to a source of electrical power;

providing switching circuitry including at least one synchronous rectifier device and adapted to operate in a selected one of (a) an active bi-directional mode of operation when enabled and (b) an inactive unidirectional mode of operation when disabled, said switching circuitry thereby rectifying substantially alternating current to produce substantially direct current;

sensing said duty cycle (D) of said at least one power switch;

comparing said duty cycle (D) with a threshold duty cycle and developing a control signal in accordance therewith; and employing synchronous rectifier control circuitry to enable and disable said switching circuitry as a function of a characteristic associated with said power supply and apply said control signal to disable said at least one synchronous rectifier device when said duty cycle (D) drops below said threshold duty cycle thereby to prevent substantial reverse power flow through said power supply.

50. The method as recited in claim 49, further comprising:

providing a power transformer having primary and secondary windings;

coupling said at least one power switch to said primary winding;

coupling said switching circuitry to said secondary winding; and limiting a voltage across said power transformer during at least a portion of a non-conduction interval of said at least one power switch.

51. The method as recited in claim 49, further comprising:

parallel-coupling said power supply to a second power supply;

allowing said synchronous rectifier control circuitry to disable said control driven switching circuitry thereby preventing said second power supply from causing said substantial reverse power flow; and effecting load sharing between said power supply and said second power supply.

52. The method as recited in claim 49 wherein said switching circuitry comprises discrete diodes to allow said control driven switching circuitry to operate in said inactive unidirectional mode of operation.

53. The method as recited in claim 49 wherein said switching circuitry comprises a plurality of synchronous rectifier devices, said synchronous rectifier control circuitry adapted to disable all of said plurality of synchronous rectifier devices.

54. The method as recited in claim 49 further comprising detecting parallel operation between said power supply and a second power supply, said synchronous rectifier control circuitry adapted to disable said switching circuitry only when said power supply is parallel-coupled to said second power supply.

* * * * *

UNITED STATES PATENT AND TRADEMARK OFFICE
CERTIFICATE OF CORRECTION

PATENT NO.    : 5,920,475
DATED         : July 6, 1999
INVENTOR(S)   : Jeffrey J. Boylan; Allen Frank Rozman It is certified that error appears in the above-identified patent and that said Letters Patent is hereby corrected as shown below:

Title page, item [75],
Line 4, change "Jeffrey L. Boylan" to --Jeffrey J. Boylan--.

Please Replace the formal drawings of FIGUREs 1-3, 5 and 6 with the corrected formal drawings attached hereto.

Column 1,
Line 57, delete "transistor" and insert --transistors--.

Column 4,
Line 40, following "current" and insert --flow--.

Column 5,
Line 2, delete "08/343,712" and insert --08/434,712--.
Lines 66-67, delete "08/343,712" and insert --08/434,712--.

Column 7,
Line 1, delete "08/343,712" and insert --08/434,712--.

Column 14,
Line 3, delete "said" prior to "substantial."
Line 62, delete "said" prior to "substantial."

Column 15,
Line 30, "to" should be --and--.
Line 52, delete "control driven".
Line 53, delete "said" prior to "substantial."
Line 59, delete "control driven."

UNITED STATES PATENT AND TRADEMARK OFFICE
CERTIFICATE OF CORRECTION

PATENT NO. : 5,920,475
DATED : July 6, 1999
INVENTOR(S) : Jeffrey J. Boylan; Allen Frank Rozman It is certified that error appears in the above-identified patent and that said Letters Patent is hereby corrected as shown below:

Column 17,
Line 7, delete "start-up".
Line 31, delete "control driven".
Line 39, delete "control driven".

Column 20,
Line 2, delete "control driven".
Line 9, delete "control driven".

Signed and Sealed this

Second Day of October, 2001

*Attest:*

*Attesting Officer*

NICHOLAS P. GODICI
*Acting Director of the United States Patent and Trademark Office*